United States Patent [19]

Powell

[11] 3,766,948
[45] Oct. 23, 1973

[54] BICYCLE SPEEDOMETER CASING ASSEMBLY
[75] Inventor: Patrick L. Powell, Franklin Park, Ill.
[73] Assignee: Stewart-Warner Corporation, Chicago, Ill.
[22] Filed: Dec. 6, 1971
[21] Appl. No.: 204,840

[52] U.S. Cl. .................. 138/109, 285/14, 285/328
[51] Int. Cl. ............................................. F16l 9/00
[58] Field of Search ............ 138/109; 264/296, 264/295, 320; 285/328

[56] References Cited
UNITED STATES PATENTS
3,557,275 1/1971 Longshaw et al. ................. 138/109
3,521,910 7/1970 Callahan et al. .................... 285/328

Primary Examiner—George E. Lowrance
Assistant Examiner—Steven M. Pollard
Attorney—Augustus G. Douvas et al.

[57] ABSTRACT

The following specification describes a plastic casing for a bicycle speedometer flexible shaft in which the casing ends are cold formed to provide shoulders. The shoulders are engaged by an internal shoulder of a respective nut for attaching the casing to the speedometer and drive unit, respectively, and the nuts each have a rearwardly extending tubular portion for supporting the casing.

1 Claim, 6 Drawing Figures

PATENTED OCT 23 1973 3,766,948
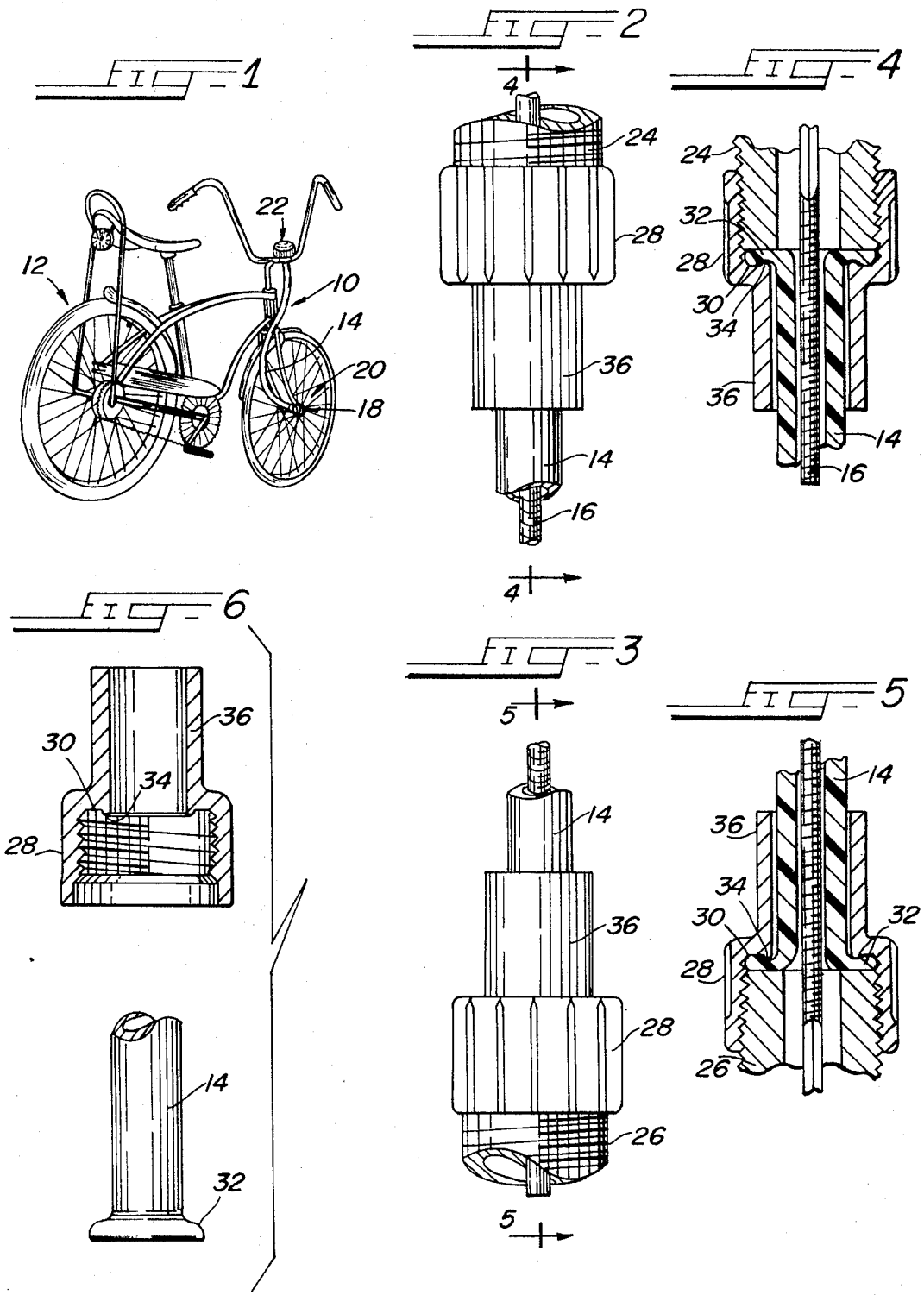

BICYCLE SPEEDOMETER CASING ASSEMBLY

BACKGROUND OF THE INVENTION

1. Field of the Invention

This invention relates in general to flexible shaft casing assemblies and more particularly to a more economical bicycle speedometer flexible shaft casing assembly.

2. Brief Description of the Prior Art

A flexible shaft casing carries a flexible shaft for transmitting power from a drive unit to a speedometer or other instrument, for example. The casing is fastened to the drive unit and the speedometer by means of respective metal ferrules each crimped on a casing end and having a shoulder formed at one end for engaging a shoulder on a respective nut carried by the casing. The nuts are threaded on the drive unit and speedometer, respectively, to secure the respective ferrule shoulder against the drive unit and speedometer, respectively, and thereby hold the casing in position. The described prior art casing assembly requires the manufacture of tubular ferrules and the assembly thereof to the casing, which is expensive and sometimes subject to failure when the ferrules pull loose.

SUMMARY OF THE INVENTION

The present invention proposes to simplify the manufacture of a bicycle flexible shaft casing assembly by eliminating the use of metal ferrules at opposite ends. Instead, an integral radially outwardly extending shoulder is simply formed at each casing end to engage the internal shoulder of the respective nut and thereby both hold the nuts on the casing and enable the casing to be fastened to both the drive unit and speedometer. In addition, the nuts are provided with elongated tubular portions extending over the casing to support and protect the casing ends.

It is therefore an object of the present invention to provide a more economical and reliable flexible shaft casing.

Other objects and features of the present invention will become apparent on examination of the following specification and claims together with the accompanying drawings.

BRIEF DESCRIPTION OF THE DRAWINGS

FIG. 1 is a view of a bicycle illustrating the flexible shaft casing fastened to a drive unit and speedometer;

FIG. 2 is a fragmentary view of one end of a flexible shaft assembly fastened on a speedometer;

FIG. 3 is a fragmentary view of the opposite end of the flexible shaft assembly shown in FIG. 2 fastened on a drive unit;

FIG. 4 is a sectional view taken along the line 4—4 in FIG. 2 and looking in the direction of the arrows;

FIG. 5 is a sectional view taken along the line 5—5 in FIG. 3 and looking in the direction of the arrows; and FIG. 6 is an exploded view illustrating one end of the casing and associated nut in section.

DESCRIPTION OF THE PREFERRED EMBODIMENT

Referring to FIG. 1 a flexible shaft assembly 10 is indicated for use on a bicycle 12. The assembly 10 comprises a casing 14 carrying a flexible shaft 16 seen in FIGS. 2-5 for transmitting rotational movement from a conventional drive unit 18 mounted on the front wheel assembly 20 of the bicycle 12 to a speedometer 22 carried by the bicycle for indicating bicycle speed and distance traveled, if the speedometer is equipped with an odometer.

The casing 14 comprises a plastic tube such as a high-density polyethylene or a polypropelene in which the flexible shaft is disposed. The shaft 16 is provided with non-circular or squared ends for conventionally engaging in respective correspondingly shaped openings of a magnet shaft (not shown) rotatably carried in a speedometer boss 24, seen in FIG. 2, and a gear hub (not shown) rotatably carried in a boss 26 of the drive unit 18.

Each boss 24 and 26 is externally threaded to receive a respective nut 28 having internal threads. An internal annular or radially inwardly extending shoulder 30 is formed at the end of the threaded portion of each nut 28 for sandwiching a radially outwardly extending shoulder 32 on each casing end against the respective end of bosses 24 and 26 to secure the casing to the respective boss.

The casing 14 has an inner diameter of substantially 0.160 inches and an outer diameter of substantially 0.3 inches with the shoulder 32 having a diameter of substantially 0.5 inches. The casing thus has a thicker wall than the conventional casing and the shoulder 32 is cold formed on each end of casing 14, after the nuts 28 are assembled thereto, so that the nuts cannot thereafter be inadvertently disassembled from the casing.

Each nut 28 has an integrally formed spherical projection 34 with a diameter of 0.015 inches at the inner diameter of shoulder 30 for grasping or gripping shoulder 32, and a tubular portion or sleeve 36 integrally formed on the nut extending axially for ½ inches from the shoulder 30 in a direction opposite the threaded portion. The inner diameter of the tubular portion 36 corresponds closely to the outer diameter of the casing with a difference of between 0.004 inches to 0.01 inches for encircling a portion of each end of the casing 14 directly behind the respective shoulder to prevent deformation, shifting or displacement of the tube or shoulder during and after assembly to the respective boss.

The foregoing is a description of an improved bicycle flexible shaft casing whose inventive concepts are believed set forth in the accompanying claims.

What is claimed is:

1. A flexible shaft casing assembly for supporting a flexible shaft along a curved path between a pair of externally threaded bosses, comprising a plastic tube adapted to carry said shaft along said curved path and having an outwardly extending radial external solid shoulder at each end for engagement with the end of a respective boss, a pair of nuts carried by said tube with each nut having an internally threaded portion for engaging a respective threaded boss with each internally threaded portion having a larger diameter than the respective tube shoulder for passage over the respective shoulder, an internal annular radially inwardly extending shoulder for each nut having an inner diameter larger than said tube and overlapping each tube shoulder for clamping a respective tube shoulder against a respective boss end in response to said nut being threaded on said boss, a sleeve integrally formed on each nut shoulder extending axially in a direction opposite the respective nut threaded portion with each sleeve having an inner diameter corresponding to said tube outer diameter and overlapping said tube for supporting said tube along said curved path, a projection on each nut shoulder extending axially toward said threaded portion and radially located substantially adjacent the inner diameter of said tube shoulder, and a recess formed in each tube solid shoulder by a respective projection to a depth corresponding to the respective projection extension from the respective nut shoulder in response to the threading of the respective nut on the respective boss for gripping each tube shoulder whereby said tube is secured to each boss without a ferrule.

* * * * *